United States Patent [19]

Lunn

[11] 4,449,146

[45] May 15, 1984

[54] INTEGRATOR CIRCUIT FOR SEPARATING VERTICAL SYNC PULSES

[75] Inventor: Gerald Lunn, Scottsdale, Ariz.

[73] Assignee: Motorola, Inc., Schaumburg, Ill.

[21] Appl. No.: 220,614

[22] Filed: Dec. 29, 1980

[51] Int. Cl.³ .............................................. H04N 5/10
[52] U.S. Cl. .................................... 358/154; 307/358; 307/246
[58] Field of Search ................ 358/154; 307/246, 358, 307/362; 328/139

[56] References Cited

U.S. PATENT DOCUMENTS

| | | | |
|---|---|---|---|
| 3,639,780 | 2/1972 | Lovelace | 307/358 |
| 3,639,786 | 2/1972 | Lovelace | 307/358 |
| 3,770,987 | 11/1973 | McSweeney | 307/246 |
| 3,879,576 | 4/1975 | Okada et al. | 307/358 |

OTHER PUBLICATIONS

*RCA Technical Notes*, "Current Mirror Amplifiers", TN No. 949, J. S. Radovsky, 7 pp., Dec. 1973.

*Primary Examiner*—Richard Murray
*Attorney, Agent, or Firm*—Charles R. Lewis

[57] ABSTRACT

An improved vertical sync separator for a TV receiver includes an integrator circuit that comprises a current mirror one current path coupled to a normally conducting semiconductor element to discharge a capacitor and another current path coupled to a signal receiving semiconductor element to charge the capacitor. The output of the integrator circuit is coupled to an amplifier having a slicing level that varies with the strength of the received signal.

19 Claims, 5 Drawing Figures

INTEGRATOR CIRCUIT FOR SEPARATING VERTICAL SYNC PULSES

CROSS REFERENCE TO RELATED APPLICATIONS

1. Ser. No. 220,606, filed Dec. 29, 1980 "Horizontal Oscillator"
2. Ser. No. 220,604, filed Dec. 29, 1980 "Horizontal Phase Detector Gain Control"
3. Ser. No. 220,608, filed Dec. 29. 1980 "Horizontal Phase Lock Loop For Television"
4. Ser. No. 220,328 dated Dec. 29. 1980 "Linear Full Wave Rectifier and Method for Providing Full Wave Rectified Signals"
5. Ser. No. 220,607 dated Dec. 29, 1980 "Large Scale, Single Chip Integrated Circuit Television Receiver Subsystem"
6. Ser. No. 220,609 dated Dec. 29, 1980 "Variable Capacitance Circuit"
7. Ser. No. 220,605 dated Dec. 29, 1980 "Crossover Circuit for Use in Automatic Gain Control Systems"
8. Ser. No. 220,329 dated Dec. 29, 1980 "Linear Full Wave Rectifier Circuit"
9. Ser. No. 220,611 dated Dec. 29, 1980 "Sync Separator"
10. Ser. No. 220,610 dated Dec. 29, 1980 "Vertical Sync Counter Having Multi Modes of Operation For Different TV Systems"

BACKGROUND OF THE INVENTION

This invention relates to integrator circuits and more particularly to an integrator circuit that utilizes a current mirror circuit in combination with at least two current sources to separate vertical sync pulses from horizontal sync pulses in a television (TV) receiver.

A typical TV receiver separates the vertical sync pulses from the horizontal sync pulses by passing the composite sync waveform through an integrator circuit which smoothes the narrow horizontal sync pulses and provides a rapidly rising voltage for the broad sync pulses. A slicer set to about one-half the pulse height provides a sharp output pulse to synchronize the vertical deflection system.

More TV receivers are being fabricated with one or more integrated circuits. In order to save pin-outs on the integrated circuitry and to eliminate relatively expensive external discrete components, it is desirable that passive components, such as the integrator capacitance, be incorporated into the integrated circuit. It is also desirable for a vertical sync separator circuit to have different time constants for charge and discharge of the capacitor under different received signal conditions to improve noise performance.

Accordingly, one object of this invention is to provide an improved integrator circuit for separating vertical sync signals from horizontal sync signals in a TV receiver.

Another object of this invention is to provide an integrator circuit that can be readily fabricated in an integrated circuit.

A further object of this invention is to provide an integrator circuit having a time constant that varies with the magnitude of the signal applied thereto.

Still another object of this invention is to provide an integrator circuit having different time constants for charging and discharging a capacitor.

SUMMARY OF THE INVENTION

Briefly described, the integrator circuit of this invention includes a capacitor coupled between first and second current sources with the first current source discharging the capacitor and the second current source charging the capacitor and with the magnitude of the charging current provided by the first current source being less than that provided by the second current source. A current mirror circuit has a first current path coupled to the first current source and a second current path coupled to the second current source. The current from the first current source flows therefrom through the first current path of the current mirror and also through the capacitor and the second current path of the current mirror to discharge the capacitor whereas the current from the second current source flows therefrom through the second current path of the current mirror and also through the capacitor and the first current path of the current mirror to charge the capacitor. The output of the integrator is coupled to a slicer having a bias thereon determined by the strength of the received signal.

DESCRIPTION OF THE DRAWINGS

The above and other objects, features, and advantages of the present invention will be readily apparent from consideration of the following detailed description taken in conjunction with the following drawing, wherein like reference characters designate like or corresponding parts throughout the several views and wherein.

DESCRIPTION OF THE PREFERRED EMBODIMENT

Before embarking on a detailed discussion of the invention, it may be helpful to briefly review basic television principles. A complete TV picture appears on the TV screen a number of times per second and consists of two interlaced frames. Between each frame there is an interval during which the screen is dark. Each TV frame, however, is not projected as a complete unit but is created by varying the brightness of a moving spot of light. That is, the picture tube contains an electron gun which generates an electron beam which moves very rapidly across a phosphor coated screen and, by changing its strength, different amounts of light are produced in different places. More exactly, the electron beam is focused into a fine point that moves from the upper left-hand corner in a straight nearly horizontal line to the right side of the screen. After each movement from left to right, the beam intensity is reduced so that no light is produced during the return motion from right to left. After each line is painted, the beam is moved down a little on the tube face. While the motion of the electron beam is called "scanning", the electronic actions involved are generally referred to as "sweeping" and we speak of a horiziontal sweep frequency of approximately 15,750 cycles per second.

It should be obvious that there must be some synchronization between the image seen by a remote television camera and that which is ultimately shown on the TV screen. If, for example, the receiver scans a picture in more or less than one-thirtieth of a second, the picture will appear to roll vertically. Thus, great care is taken to synchronize accurately the scanning of each line and frame. To achieve this, synchronizing signals are transmitted to the receiver with the sound and video information. In addition to providing signals which control the starting of each line, the edges of the picture must be blanked out to avoid any appearance of ragged edges, and the electron beam must be turned off during the time in which it returns to its starting place. This return time is often referred to as the retrace or flyback period and is approximately 9 microseconds long for each line (the horizontal flyback), but is considerably longer for the period when the beam returns from the bottom to the top of the screen (the vertical flyback period).

Figure 1:
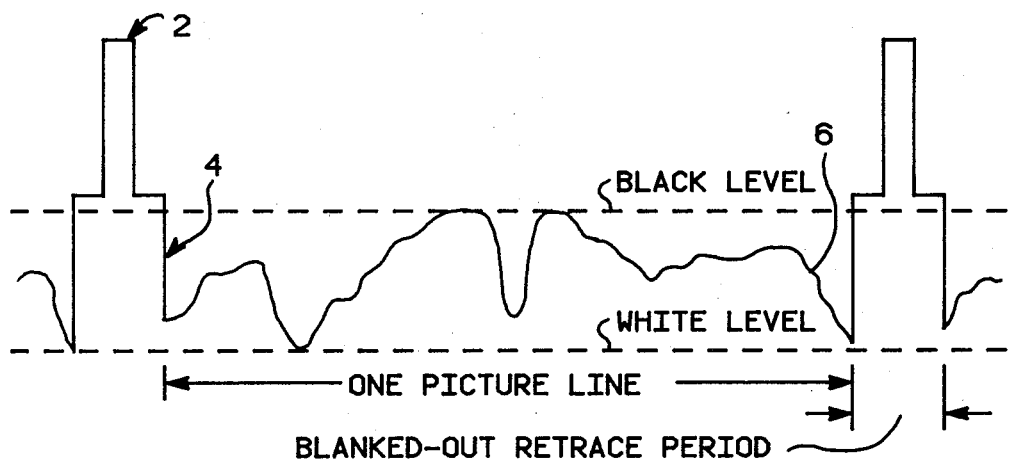
FIGS. 1 and 2 illustrate the composite video signal received by a television (TV) receiver.

FIG. 1 illustrates a black and white video signal including the horizontal synchronization pulses 2 and the horizontal blanking or flyback pulse 4. Interposed between successive blanking pulses is the actual black and white video signal 6 corresponding to one picture line. As can be seen, the horizontal blanking pulse 4 extends into the black region so that the edges of the picture are completely black avoiding the appearance of ragged edges.

Figure 2:
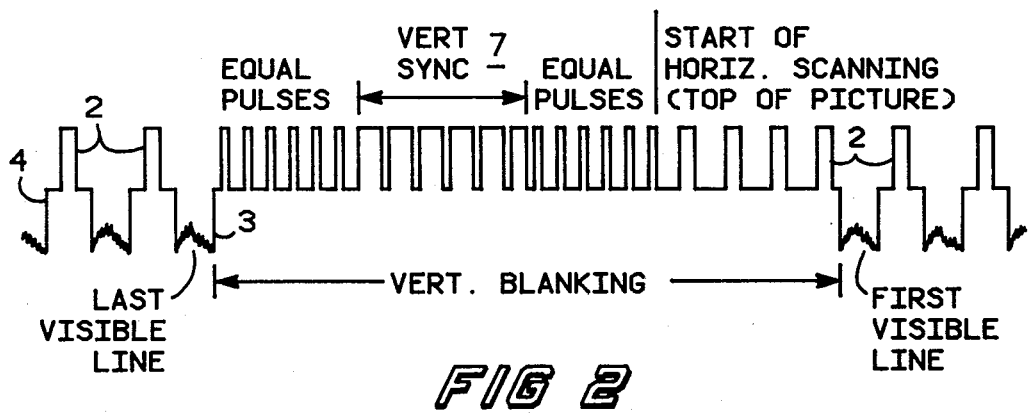

Referring to FIG. 2, the start of each field of vertical scanning is dictated by a vertical synchronization pulse 7 which lasts much longer than the horizontal synchronization pulses 2. To avoid losing horizontal synchronization during the vertical flyback or blanking period, the horizontal synchronization pulses 2 are superimposed on the vertical blanking pulse 3. The first six pulses are very narrow and are referred to as equalizing pulses. Next, there are periods of six wide pulses which comprise the actual vertical synchronization pulse serrated by the horizontal synchronization period. This is followed by an additional six equalizing pulses and then four regular horizontal synchronizing pulses 2 that start the top of the picture. Note that the vertical blanking period 3 extends through this time and darkens the screen while the beam moves from bottom to top and covers the first four lines of the picture.

Figure 3:
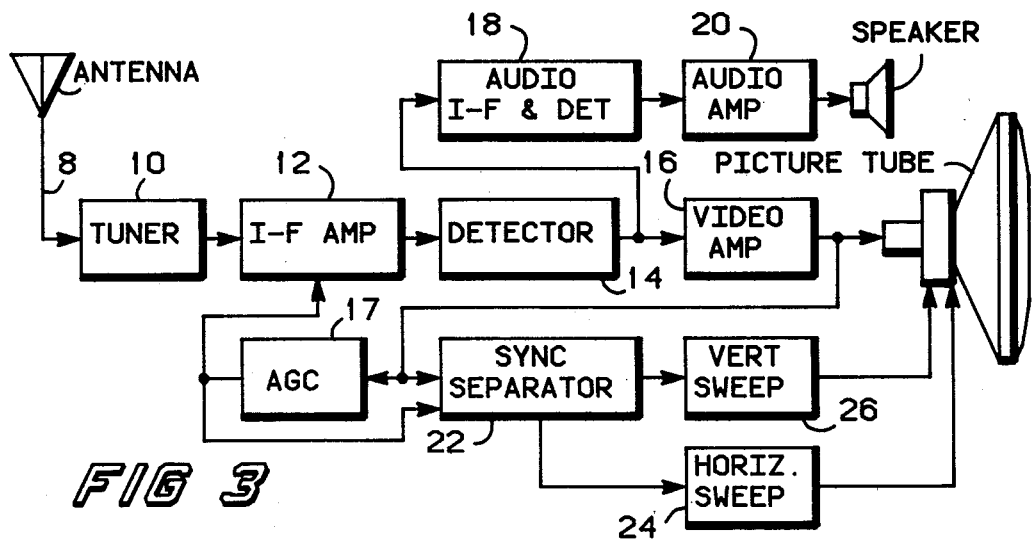
FIG. 3 is a block diagram of a basic prior art television receiver.

FIG. 3 is a block diagram of a basic black and white TV receiver. From the antenna, a transmission line 8 brings all signals received by the antenna to tuner 10 whose function it is to select the desired band of frequencies and reject all others. The tuner passes only the desired signal to the IF amplifiers 12.

Television IF amplifiers 12 include a plurality of IF stages which amplify the IF signals. To prevent overloading and to minimize picture changes during fading, automatic gain control is used to control the amplification of the IF signal.

The output of IF amplifiers 12 is applied to a detector 14 which removes the amplitude modulated video signal and applies it to video amplifier 16. The sound signal is removed, amplified, clipped, and limited in audio section 18. The output of audio detector 18 is applied to audio amplifier 20 which is similar to audio amplifiers found in radio receivers. The output of the audio amplifier is applied to the speaker.

Video amplifier 16 requires more bandwidth than audio amplifier 20. This is often accomplished using special peaking circuits for the high frequency response. The output of video amplifier 16 is applied to the picture tube and to a sync separator 22 which is unique to television receivers. As described earlier, the horizontal 2 and vertical 7 synchronization pulses appear on top of their respective blanking signals 4 and 3 which are sandwiched in between lines of picture signal. The sync separator 22 clips the synchronization pulses off the composite video signal after the signal has been amplified in video amplifier 16. Two separate filters may be employed to separate the vertical from the horizontal synchronization pulses. For example, a high pass filter would permit only the horizontal synchronization pulses to reach horizontal sweep section 24 while the vertical pulses could be passed through a low pass filter to the vertical sweep section 26. In accordance with the present invention an improved integrator circuit is provided to separate the vertical sync pulses.

The vertical sweep section generates the actual signals which pass through the deflection yoke of the picture tube to move the electron beam up and down. Similarly, the horizontal sweep section is responsible for moving the electron beam across the tube. In order to obtain the large current of short duration required in the horizontal deflection coils, a transformer is generally used. Furthermore, a flyback transformer is generally considered part of the horizontal sweep section. This transformer generates a high voltage during the time in which the electron beam returns from right to left.

Co-pending U.S. Pat. Application Ser. No. 220,607 dated Dec. 29, 1980 entitled "Large Scale, Single Chip Integrated Circuit Television Receiver Subsystem" and filed of even date herewith describes a VLSI single chip black and white television receiver into which the inventive vertical sync counter may be incorporated. It is to be understood, however, that the present invention may also be incorporated into a color TV receiver.

Figure 4:
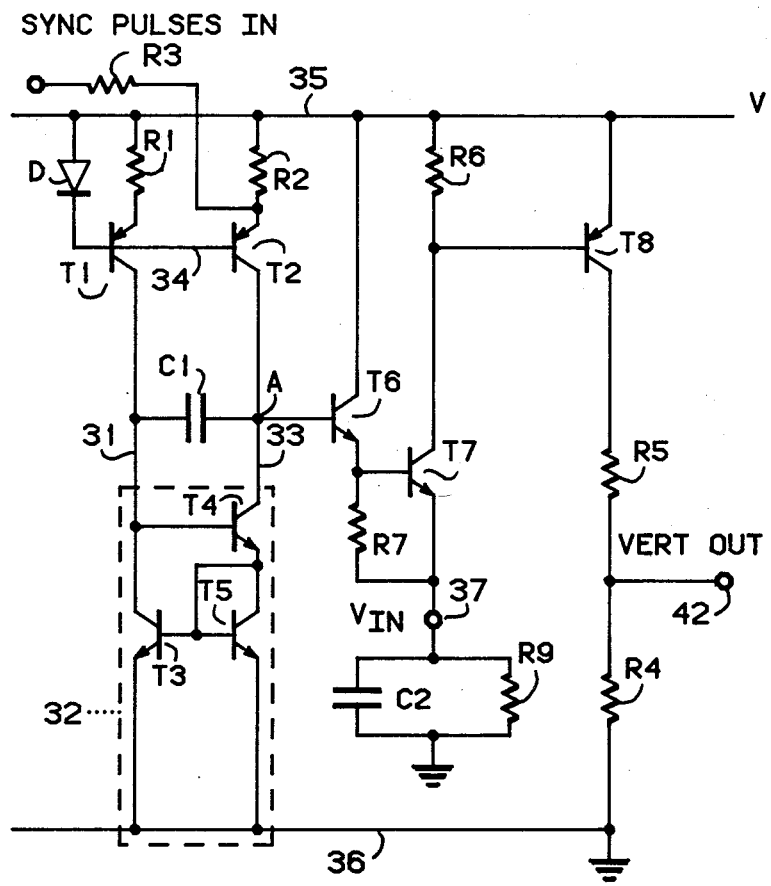
FIG. 4 is a schematic diagram of an integrator circuit in accordance with the present invention.

An integrator circuit for separating vertical sync pulses from a composite signal including horizontal and vertical sync pulses in accordance with the present invention is shown in FIG. 4. A first current source, such as normally conducting PNP transistor $T_1$, has its emitter coupled to a conductor 35, to which a source of operating potential V may be applied, by way of a resistor $R_1$ and its base coupled to the conductor 35 by way of a diode D. The collector of transistor $T_1$ is coupled to a lead 31 which forms a first current path to a current mirror circuit 32. A second current source, such as normally nonconducting PNP transistor $T_2$, has its emitter coupled to the conductor 35 by way of a resistor $R_2$ and its base coupled to the base of transistor $T_1$. The collector of transistor $T_2$ is coupled to a lead 33 which forms a second current path to the current mirror circuit 32. The emitter of transistor $T_2$ is adapted to receive a signal to be integrated by way of a limiting resistor $R_3$. A capacitor $C_1$ is coupled between the leads 31 and 33 and therefore between the collectors of the first $T_1$ and second $T_2$ current sources.

The current mirror circuit 32 is well known in the art and is often referred to as a Wilson current mirror circuit and may have a current ratio of unity or greater than unity. The current mirror circuit includes an NPN transistor $T_3$ having its collector coupled to lead 31 and its emitter coupled to a reference potential such as ground. Also included in the current mirror circuit are series connected NPN transistors $T_4$ and $T_5$ with the collector of transistor $T_4$ coupled to the lead 33 and the emitter coupled to the collector of transistor $T_5$ which has its emitter coupled to ground. The base of transistor $T_5$ is coupled to the emitter of transistor $T_5$ and also to the base of transistor $T_3$. The base of transistor $T_4$ is coupled to the lead 31 and, therefore, the collector of transistor $T_3$.

Once the video portion of the signal shown in FIG. 2 has been removed in a well known manner, the resulting horizontal 2 and vertical 7 sync pulses are applied to the collector of transistor $T_2$. In the absence of a horizontal 2 or vertical 7 sync pulse, transistor $T_2$ is nonconducting and transistor $T_1$ is conducting. The current flow from transistor $T_1$ is therefrom and through lead 31 to the current mirror 32 and also through capacitor $C_1$ through lead 33 to the current mirror 32 to discharge the capacitor $C_1$ thereby decreasing the voltage at point A. In the presence of a positive horizontal 2 or vertical 7 sync pulse, transistor $T_2$ also conducts. However, transistor $T_2$ is designed to provide a higher magnitude of current when it is conducting than does transistor $T_1$. The current from transistor $T_2$ flows through lead 33 to the current mirror 32 and also through the capacitor $C_1$ and lead 31 to the other side of the current mirror 32. Since the magnitude of the current supplied by transistor $T_2$ is greater, it overrides the opposite current flow through capacitor $C_1$ provided by transistor $T_1$ and charges the capacitor $C_1$ thereby increasing the voltage at point A. The time constant for discharging the capacitor $C_1$ is designed to be larger than the time constant for charging the capacitor $C_1$ thereby making the potential at point A substantially independent of the narrow horizontal sync pulses that occur during the occurrence of a vertical 7 sync pulse and also to provide good noise performance. Also, since the magnitude of conduction of transistor $T_2$ is determined by the magnitude of the signal applied thereto by way of resistor $R_3$, the charging time of the integrator circuit will effectively be increased as the received signal increases and will effectively be reduced at low signal levels. The reduced charge time effectively raises the slicing level to a point closer to the peak of the incoming signal and thus tends to reduce the interfering effect of noise on the base line.

The potential at point A is applied to a variable bias slicer amplifier which includes transistors $T_6$ and $T_7$. Transistor $T_6$ has its collector coupled to conductor 35; its base coupled to point A and its emitter coupled to a pin 37 by way of a resistor $R_7$. The pin 37 may constitute a pad of an integrated circuit. Also coupled to the pin 37 are a discrete capacitor $C_2$ and a discrete resistor $R_9$ which, in accordance with one embodiment of this invention, can be located outside of a packaged integrated circuit and which are connected between ground and the pin 37 in parallel with one another as shown. Transistor $T_7$ has its collector coupled to conductor 35 by way of load resistor $R_6$, its base coupled to the emitter of transistor $T_6$ and its emitter coupled to pin 37. As will be apparent to those skilled in the art, transistors $T_6$ and $T_7$ constitute a Darlington type amplifier. When transistors $T_6$ and $T_7$ conduct due to a positive voltage on the base of transistor $T_6$, the capacitor $C_2$ charges. The charge on the capacitor $C_2$ provides a slicing level $V_s$ that is determined by the magnitude of the voltage on the base of transistor $T_6$ and the time during which transistor $T_6$ and $T_7$ are nonconducting. In accordance with the present invention the time constant of resistor $R_9$ and capacitor $C_2$ was chosen to be long in comparison to the time between vertical pulses 7. Accordingly, the charge on the capacitor $C_2$ decreases very little between vertical sync pulses 7. The variable bias provided by the charge on the capacitor $C_2$ is determined by the magnitude of the voltage at point A which in turn is determined by the strength of the signal arriving at the TV receiver. The slicing level $V_s$ of the amplifier $T_6$ and $T_7$ therefore is determined by the strength of the received signal. In accordance with the present invention resistor $R_9$ and capacitor $C_2$ where chosen to provide a slicing level $V_s$ about midway along the vertical pulse height for strong signals to provide good impulse noise performance and which increases up toward the vertical pulse tip as the incoming signal decreases. The output of the slicing amplifier (transistors $T_6$ and $T_7$) is applied to the base of an inverting and amplifying transistor $T_8$ which has its emitter coupled to conductor 35 and its collector coupled to ground by way of series connected resistors $R_4$ and $R_5$. The separated vertical sync pulses are outputted from the junction of resistors $R_4$ and $R_5$ at output terminal 42.

Assume that a horizontal or vertical sync pulse is not present at the emitter of transistor $T_2$. As set forth above, this results in transistor $T_1$ being conductive, transistor $T_2$ being nonconductive and the capacitor $C_1$ being discharged. Assume now that a sync pulse, shown as waveshape 38 in FIG. 5 occurs. This results in the conduction of transistor $T_2$ and the charging of capacitor $C_1$ as described. The resulting potential at point A is shown as waveshape 39 in FIG. 5. As shown, the potential at point A will continue to increase as long as the sync pulse 38 is present i.e. the pulse 38 is integrated. For transistors $T_6$ and $T_7$ to conduct, however, the potential at point A must exceed the charge on capacitor $C_2$ and the base to emitter voltages of transistors $T_6$ and $T_7$ (shown as slicing voltage level $V_s$ in FIG. 5). In the case of horizontal sync pulses this slicing potential $V_s$ is never reached due to their relatively short duration and the occurrence of horizontal sync pulses do not provide an output at the terminal 42. In the case of vertical sync pulses, however, the potential at point A (waveshape 39) continues to increase during their relatively long duration. When the slicing voltage level $V_s$ is reached transistors $T_6$, $T_7$ and $T_8$ conduct and the output at terminal 42 goes high as shown by waveshape 41 in FIG. 5. After the occurrence of the vertical sync pulse, the capacitor $C_1$ will begin to discharge and the potential at point A will begin to decrease. Since the discharge time constant is greater than the charge time constant, the potential at point A will decrease at a rate slower than which it increased. When the potential starts to decrease the capacitor potential cannot follow because the discharge time constant is long. Transistor $T_6$, $T_7$ and $T_8$ will become nonconducting and the output 41 will be low.

Figure 5:
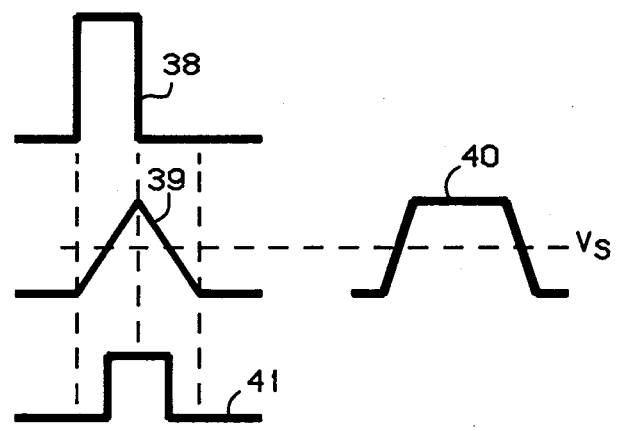
FIG. 5 illustrates waveforms appearing at certain points in FIG. 4.

A strong incoming signal may cause transistor $T_2$ to saturate which will result in the potential at point A having a flat top as shown by waveshape 40 in FIG. 5. As shown by a perusal of FIG. 5, the output vertical sync pulse 41 is offset from the incoming vertical sync pulse 38. However, since this offset remains the same for a given signal being received, the offset is immaterial. Also the size of capacitor $C_1$ (about 30 pf) enables it to be readily fabricated as part of an integrated circuit.

As will now be apparent, the integrator of the present invention may be readily fabricated as an integrated circuit, has a time constant that varies with the strength of the received signal, has different time constants for charging and discharging of a capacitor and which includes a slicing level which varies in accordance with the strength of the received signal.

As will also be apparent to those skilled in the art, changes and modifications may be made to the integrator described without departing from the spirit and scope of this invention as defined in the following claims.

What is claimed is:

1. An integrator circuit comprising;
a capacitor,
at least a first current source for discharging said capacitor,
at least a second current source for charging said capacitor,
the magnitude of current provided by said second current source being greater than the magnitude of current provided by said first current source, and
a current mirror circuit having at least first and second current paths coupled to said first and second current sources, respectively.

2. The integrator according to claim 1 wherein
said capacitor is coupled between said first and said second current paths.

3. The integrator according to claim 2 wherein
said first and second current sources apply current in the same direction to said current mirror circuit.

4. The integrator according to claim 3 wherein
the current from said first current source flows therefrom through said first current path of said current mirror and also through said capacitor and second current path of said current mirror to discharge said capacitor.

5. The integrator according to claim 4 wherein
the current flow from said second current source flows therefrom through said second current path of said current mirror and also through said capacitor and said first current path of said current mirror to charge said capacitor.

6. The integrator according to claim 1 wherein
said first current source includes a normally conducting semiconductor element 7. The integrator according to claim 6 wherein
said first current source includes a first transistor having at least one electrode coupled to a conductor to which an operating potential may be applied and at least another electrode coupled to said first current path of said current mirror circuit.

8. The integrator according to claim 7 wherein
said first transistor has its base and emitter electrodes coupled to said conductor and its collector electrode coupled to said first current path of said current mirror.

9. The integrator according to claim 1 wherein
said second current source includes a normally nonconducting semiconductor element that is rendered conducting by the application thereto of a signal to be integrated.

10. The integrator according to claim 9 wherein
said semiconductor element includes a second transistor having at least one electrode coupled to a conductor to which an operating potential may be applied and at least another electrode coupled to said second current path of said current mirror circuit.

11. The integrator according to claim 9 wherein
said second transistor has its emitter coupled to said conductor and its collector coupled to said second current path of said current mirror.

12. The integrator according to claims 8 or 11 wherein
the base of said second transistor is coupled to the base of said first transistor.

13. The integrator according to claim 12 further including
an impedance element coupled between the emitter of said second transistor and said conductor with the signal to be integrated being applied to said emitter of said second transistor.

14. The integrator according to claim 1 wherein
said current mirror circuit includes
at least one transistor in series with said first current path of said current mirror and at least one transistor in series with said second current path.

15. The integrator according to claim 14 further including
means coupling said transistors in said first and second current paths to one another.

16. The integrator according to claim 1 wherein
said current mirror includes
at least one transistor serially located in said first current path, and
at least two serially coupled transistors located in said second current path with the base electrode of one of said two transistors being coupled to its collector and also to the base of said transistor in said first current path with the base of the other of said two transistors being coupled to said first current path.

17. The integrator according to claim 4 further including
output means coupled to said second current path
a variable bias amplifier having an input coupled to said output means.

18. The integrator according to claim 17 wherein
said integrator is fabricated on an integrated circuit.

19. The integrator according to claim 17 wherein
said integrator is incorporated as part of a TV receiver to separate vertical sync pulses from horizontal sync pulses and the magnitude of said bias is determined by the strength of a TV signal received by said TV receiver.

* * * * *